United States Patent
McNulty et al.

(10) Patent No.: US 12,430,450 B2
(45) Date of Patent: Sep. 30, 2025

(54) RECOVERY KEY MANAGEMENT AND STORAGE

(71) Applicant: DELL PRODUCTS L.P., Round Rock, TX (US)

(72) Inventors: Kearson McNulty, Austin, TX (US); David Dyson, Pflugerville, TX (US); Marcus Molner, Austin, TX (US); Jimmy Griffith, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 258 days.

(21) Appl. No.: 18/184,171

(22) Filed: Mar. 15, 2023

(65) Prior Publication Data

US 2024/0311495 A1    Sep. 19, 2024

(51) Int. Cl.
G06F 21/60    (2013.01)
G06F 21/57    (2013.01)
G06F 21/79    (2013.01)

(52) U.S. Cl.
CPC .......... *G06F 21/602* (2013.01); *G06F 21/572* (2013.01); *G06F 21/79* (2013.01)

(58) Field of Classification Search
CPC ....... G06F 21/602; G06F 21/572; G06F 21/79
See application file for complete search history.

(56) References Cited

U.S. PATENT DOCUMENTS

| | | |
|---|---|---|
| 2009/0210456 A1 | 8/2009 | Subramaniam |
| 2010/0202617 A1 | 8/2010 | Balakrishnan et al. |
| 2014/0101135 A1* | 4/2014 | Yousaf ................ G06F 16/9535 707/E17.082 |
| 2017/0317824 A1* | 11/2017 | Brown .................. H04L 9/0894 |
| 2020/0244445 A1 | 7/2020 | Ponnusamy et al. |
| 2020/0244635 A1* | 7/2020 | Paulraj ................. H04L 9/0822 |
| 2022/0043598 A1* | 2/2022 | Ganesan ............. G06F 9/45558 |
| 2024/0111892 A1* | 4/2024 | Natili ................... G06F 21/6254 |

* cited by examiner

*Primary Examiner* — Ayoub Alata
(74) *Attorney, Agent, or Firm* — Larson Newman, LLP

(57) ABSTRACT

An information handling system retrieves a recovery key and secures the recovery key by encrypting the recovery key. Subsequent to securing the recovery key, the system injects the recovery key within a basic input/output system.

20 Claims, 3 Drawing Sheets

RECOVERY KEY MANAGEMENT AND STORAGE

FIELD OF THE DISCLOSURE

The present disclosure generally relates to information handling systems, and more particularly relates to recovery key management and storage.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system retrieves a recovery key and secures the recovery key by encrypting the recovery key. Subsequent to securing the recovery key, the system injects the recovery key within a basic input/output system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
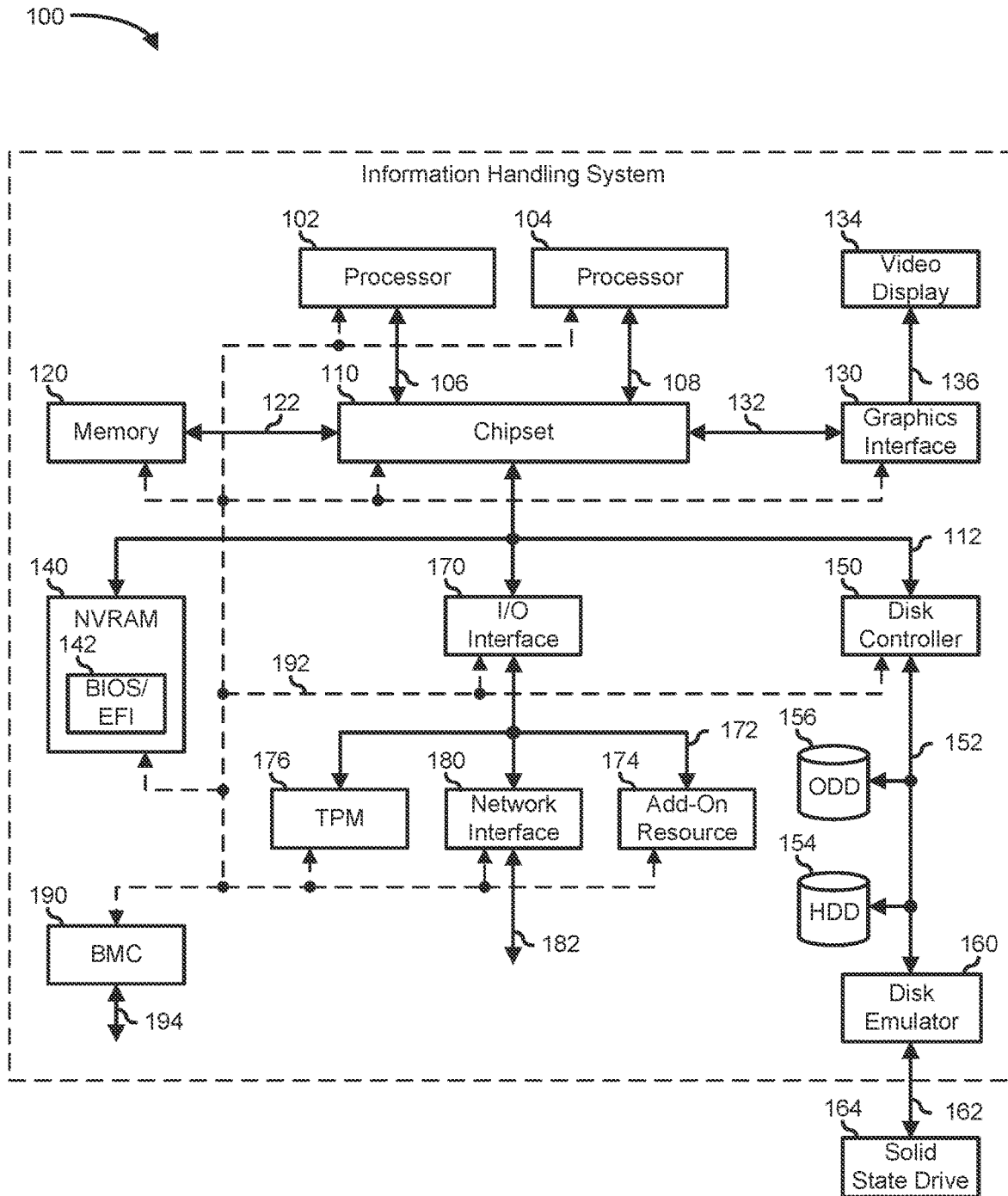
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to an add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an $I^2C$ bus, a System Management Bus (SMBus), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I²C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure, information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Information handling systems may utilize a built-in security solution such as an out-of-the-box data encryption technology option. This data encryption technology may depend on platform configuration register (PCR) banks of a trusted platform module to ensure that the information handling system has not been tampered with or a storage drive has not been moved to a different system, before booting and decrypting the drive. This security solution may encounter an issue triggering recovery. For example, a system update may trigger recovery.

In addition a user may also add or remove a PCIe-based device, which may impact hash values stored in the PCR banks triggering recovery and locking the information handling system. Because the user is not always aware that an out-of-the-box data encryption technology has been used in their information handling system, the user may not be able to perform recovery steps. For example the user may not be aware that a recovery key can be used to unlock and gain access to the information handling system, which is typically stored in the cloud. In another example the user may have lost the recovery key which may result in an inability to access, data, operations, applications, drives, or the like. Thus, users typically would contact the manufacturer of the information handling system. To assist the user and decrease the number of contacts to the manufacturer and other concerns, the present disclosure provides a system and method for local key storage and management of the recovery key.

Figure 2:
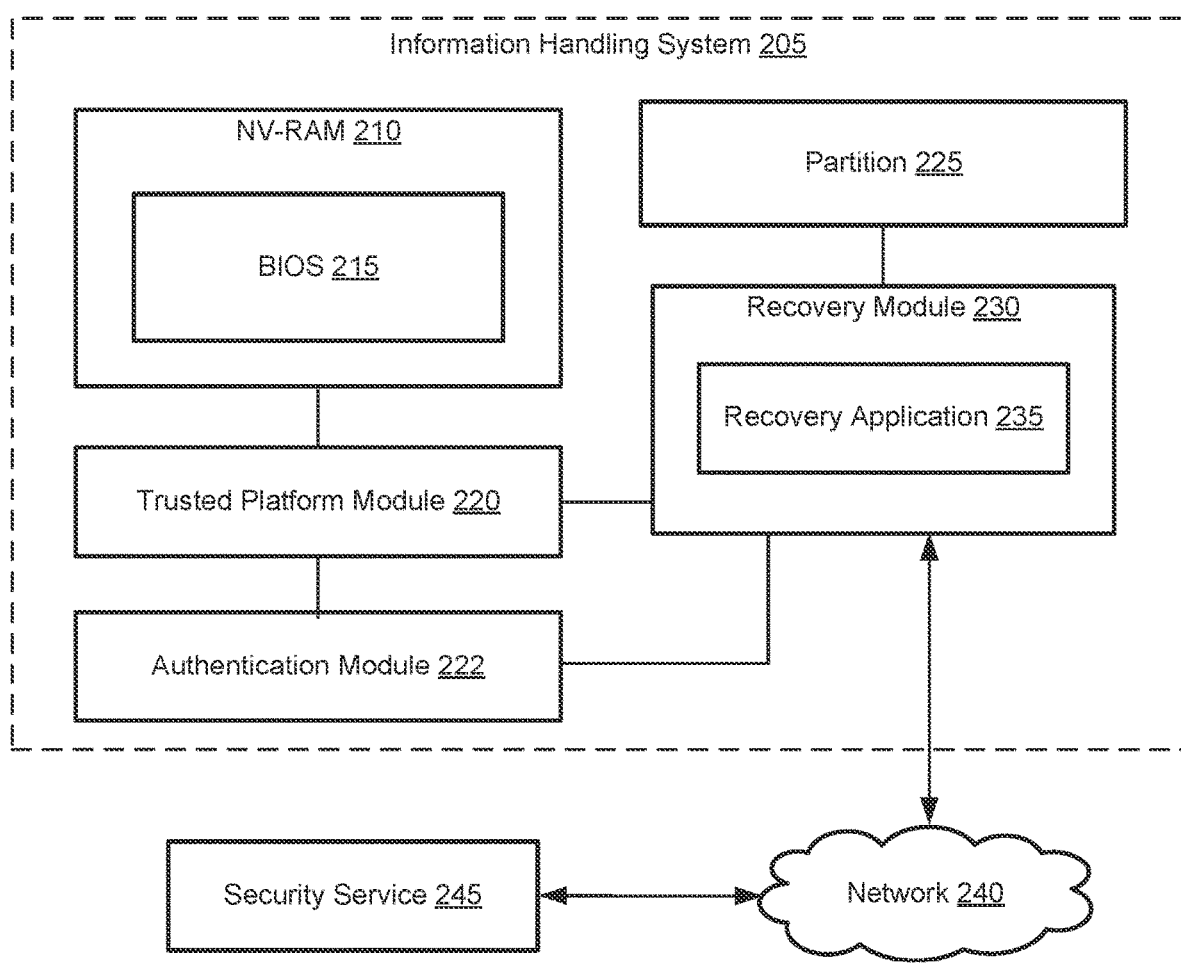
FIG. 2 is a block diagram illustrating an environment for recovery key management and storage, according to an embodiment of the present disclosure.

FIG. 2 shows an environment 200 for recovery key management and storage. Environment 200 includes an information handling system 205, a network 240, and a security service 245. Information handling system 205, which is similar to information handling system 100 of FIG, includes an NV-RAM 210, a TPM 220, a partition 225, and a recovery module 230. NV-RAM 210 includes a BIOS 215 while recovery module 230 includes a recovery application 235. The components of environment 200 may be implemented in hardware, software, firmware, or any combination thereof. The components shown are not drawn to scale and environment 200 may include additional or fewer components. In addition, connections between components may be omitted for descriptive clarity.

Information handling system 205 may include one or more partitions, such as partition 225 which can store data, software, firmware, etc. Each of the partitions may be encrypted using one of various encryption mechanisms such as BitLocker®, File Vault®, etc. The encryption mechanism may also provide full disk encryption for entire volumes of a disk. Partition 225 may be a part of a drive or a computer-readable media of information handling system 205. Partition 225 can include an extensible firmware interface system partition, and/or other partitions.

TPM 220, which is similar to TPM 176 of FIG. 1, is a microcontroller or chip that may store and manage secured data such as cryptographic keys. Accordingly, TPM 220 may be used to perform trusted computing operations. For example, TPM 220 may be used as a root of a chain of trust. In addition, TPM 220 may store data indicating the configuration of information handling system 205. In some cases, configuration data may be used by TPM 220 to prevent a different information handling system or device from accessing keys stored at TPM 220.

The encryption mechanism may use TPM 220 to generate keys to encrypt a volume of a disk to prevent unauthorized access. In one mode of operation, the encryption mechanism may use public/private keys generated by the TPM to encrypt data stored on a hard drive. The encryption mechanism protects confidential information stored in information handling systems when they are lost, stolen, inappropriately decommissioned, accessed without authorization, or the like. The encryption mechanism may also use TPM 220 to verify the integrity of early boot components and boot configuration data to ensure that encrypted volumes are accessible only if information handling system 205 has not been altered and the encrypted drive is in the original information handling system.

The recovery key can include one or more symmetric and/or asymmetric keys for encryption and/or decryption of data, files, partitions, a part of a data partition, several data partitions, and/or an entire drive. The recovery key may be a lengthy password of various lengths, such as 32 characters, 64 characters, or longer. Data in the encrypted volumes may be decrypted using a recovery key. As data on the storage device may be inaccessible under certain circumstances, such as when there is a motherboard failure or when there are changes to code executed when an information handling system is booted, the recovery key allows recovery of data on the storage device. Thus, it is essential to save the recovery key.

Accordingly, the recovery key is typically saved in an encrypted file and uploaded to a protected location within a cloud service provider, such as security service 245. However, storing the recovery key at the remote service may require the user to remember a user account and password in addition to network access. The recovery key may also be saved in a USB drive. However, recovery keys for a removable drive cannot be stored in the USB drive, floppy disk, compact disk, or similar. In addition, saving the recovery key in the USB drive, floppy disk, compact disk, or similar may pose security concerns, as the USB drive may be lost, taken, or misplaced. Thus, saving the recovery key in a secure location at a local system may provide access to the recovery when needed or desired without the need to remember the user account and password in addition to having network access. Information handling system 205 may be configured to boot into recovery mode when a boot failure is detected during an initialization sequence. While in recovery mode, a user may be able to repair information handling system 205 and/or decrypt partition 225 using the recovery key stored locally at BIOS 215.

BIOS 215, which is similar to BIOS/EFI 142 of FIG. 1, is a firmware that provides runtime services, performs a power-on self-test to initialize and test system hardware components, and loads a boot loader that initializes a kernel. BIOS 215 may be configured to store the recovery key in a designated location in NV-RAM 210 which may be a battery-powered, non-volatile memory chip, such as a complementary metal oxide semiconductor. This allows NV-RAM 210 to retain the stored information even when power is not supplied to it. The recovery key may be stored in a secure read-only region of NV-RAM 210. For example, the recovery key may be stored as a table or a variable with a field to store the recovery key. Additional information associated with the recovery key may also be stored, such as an associated account name. The recovery key may also be injected into a firmware such as BIOS 215, such as by using recovery application 235. One of the various authentication methods may be chosen to access or retrieve the recovery key from BIOS 215. For example, the recovery key may be retrieved using a BIOS administrator, a local administrator/user account, or a user account that is maintained by an information technology administrator.

Authentication module 222 may be used to authenticate credentials associated with information handling system 205 and/or a local user/administrator associated with information handling system 205. The credentials may include a user identifier and password that can be used to gain access to a device, data, or similar, such as BIOS 215 and/or security service 245. Security service 245 includes a protected key storage system which may be hosted by a server accessible by recovery application 235 via network 240. A server that hosts security service 245 may be a cloud-based server accessible via network 240. Further, the server that hosts security service 245 may be implemented as a single management server or a plurality of virtual or physical servers that may or may not be geographically co-located.

Network 240 may be implemented as or maybe a part of, a personal area network (PAN), a local area network (LAN), a metropolitan area network (MAN), a wide area network (WAN), a wireless local area network (WLAN), a virtual private network (VPN), an intranet, the Internet, or any other appropriate architecture or system that facilitates the communication of signals, data and/or messages. Network 240 may transmit data using any communication protocol, including without limitation, Fibre Channel, Frame Relay, Asynchronous Transfer Mode (ATM), Internet Protocol (IP), or other packet-based protocol. Network 240 and its various components may be implemented using hardware, software, or any combination thereof. These components may be configured to facilitate communication between recovery module 230 and security service 245.

Encrypting a storage device or a portion thereof, such as partition 225, may trigger recovery application 235 to display a recovery interface to the user. For example, after enabling encryption for a drive, or file, recovery application 235 may ask the user where to save the recovery key to a secure location. Recovery application 235 may provide several options for the user, such as whether to save the recovery key in security service 245 and/or BIOS 215. In addition, recovery application 235 may also provide the user with an option to print the recovery key, such as a portable document format file. After saving the recovery key, the encryption of the drive or a portion thereof, such as partition 225 may proceed.

A recovery mode is a mode in which information handling system 205 can boot, wherein recovery tools can be used to resolve issues with information handling system 205. For example, when information handling system 205 goes into recovery mode after failing a normal boot sequence. This event may trigger recovery application 235 to present an interface to the user for retrieving the recovery key for unlocking and/or decrypting partition 225. During the recovery mode, the encryption mechanism and secure boot may both be enabled.

The user may then choose to retrieve the recovery key within BIOS 215 and/or store it in NV-RAM 210. For example, the recovery key may be injected or stored in a designated location within BIOS 215. Before injecting within BIOS 215 or storing the recovery key in NV-RAM 210, a local account of information handling system 205 may be enabled with privileges to secure, store, extract, and/or retrieve the recovery key. For example, a local administrator may be granted access to the recovery key. Thus, the user does not need to remember the user name and password to access the recovery key store in security service 245 when information handling system 205 goes into recovery mode.

The recovery key may be retrieved after a successful user authentication and used by recovery module 230 to unlock an encrypted drive. Because the recovery key is stored locally, a local account such as a local administrator or a local user account may have access to the recovery key. Access to the recovery key may be associated with an account during an initial setup of the operating system, such as during an out-of-box experience of the Windows™ operating system. During the initial setup, the encryption mechanism and secure boot may be enabled. In addition, the user, such as a local administrator, may choose to store the recovery key within BIOS 215, at a secure location at NV-RAM 210, security service 245, or the like.

A remote account may be used to access security service 245 to store, extract, and/or retrieve the recovery key. The remote account may allow for remote connections over transmission control protocol/internet protocol (TCP/IP) such as a lightweight directory access protocol account (LDAP) account, a Microsoft™ secure account, or similar. Using LDAP, it may be possible to remotely access information handling system 205 and retrieve the recovery key from BIOS 215 and/or NV-RAM 210, helping the customer unlock their device. LDAP allows for remote connections over TCP/IP, enabling system administrators the ability to assist locked-out users. After the encryption mechanism has encrypted the drive and/or partition 225, information handling system 205 may be rebooted and the secure boot disabled.

Recovery application 235 may present a user interface that may be used to assist the user in storing, extracting, and/or retrieving the recovery key after a successful authentication of a user account. For example, when retrieving the recovery key from BIOS 215 or NV-RAM 210, the user may log in using a local user account, such as a local administrator. The recovery key may also be displayed by the user interface, such as for user confirmation. The user may also copy the recovery key and store it in another location. In one embodiment, recovery application 235 may automatically parse the firmware code of BIOS 215 to extract or retrieve the recovery key. Once the recovery key is retrieved, recovery module 230 may be configured to interact with TPM 220 to automatically unlock and/or decrypt partition 225 using the recovery key which allows the user access to its data.

Those of ordinary skill in the art will appreciate that the configuration, hardware, and/or software components of environment 200 depicted in FIG. 2 may vary. For example, the illustrative components within environment 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for the continuity of the description. Furthermore, some components that are represented as separate components in FIG. 2 may in certain embodiments instead are integrated with other components. For example, in certain embodiments, all or a portion of the functionality provided by the illustrated components may instead be provided by components integrated into one or more processor(s) as a system-on-a-chip.

Figure 3:
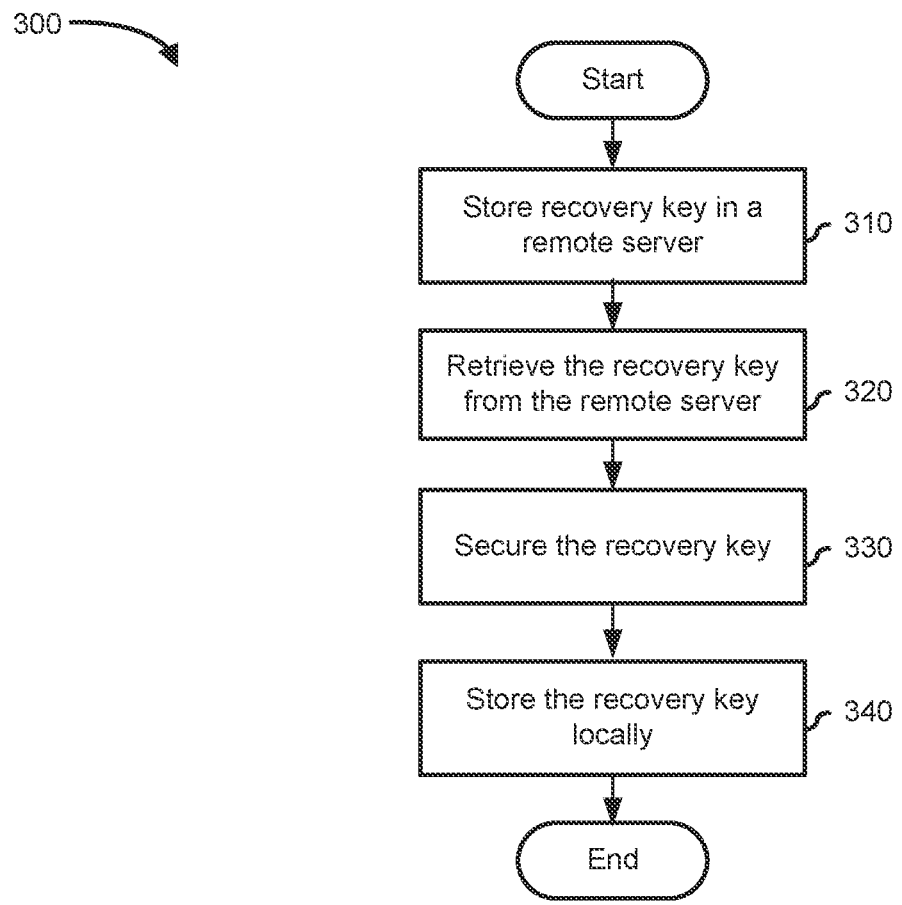
FIG. 3 is a flowchart illustrating a method for recovery key management and storage, according to an embodiment of the present disclosure.

FIG. 3 shows a flowchart of a method 300 for recovery key management and storage. Method 300 may be performed by one or more components of environment 200. For example, one or more blocks of method 300 may be performed by recovery module 230 and authentication module 222. In addition, a user may log in to a recovery application using a remote user account to gain access to a security service to store and/or retrieve the recovery key. However, while embodiments of the present disclosure are described in terms of environment of FIG. 2, it should be recognized that other systems may be utilized to perform the described method At block 310, the recovery key may be stored in a server located in the cloud. The storage of the recovery key may be a part of an initial setup of an information handling system. The method may proceed to block 320 where the method may extract or retrieve the recovery key from the remote server. The user may log in using an account authorized to retrieve or extract the recovery key from the designated location in the remote server.

The method may proceed to block 330 where the method may secure the recovery key. For example, the recovery key may be encrypted or cryptographically wrapped within another cryptographic key providing a layer of security. The method may proceed to block 340 where it may store the recovery key in a secured part of the BIOS. For example, the recovery key may be injected into the BIOS firmware. During a recovery mode, the method may parse and/or extract the recovery key from the BIOS firmware. The recovery key may then be used to decrypt the drive or partition of the information handling system.

Although FIG. 3 shows example blocks of method 300 in some implementations, method 300 may include additional blocks, fewer blocks, different blocks, or differently arranged blocks than those depicted in FIG. 3. Those skilled in the art will understand that the principles presented herein may be implemented in any suitably arranged processing system. Additionally, or alternatively, two or more of the blocks of method 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded in a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   retrieving, by a processor, a recovery key from a remote server;
   injecting the recovery key within a basic input/output system (BIOS) firmware of an information handling system subsequent to granting a local account access to the recovery key;
   providing a user interface in response to the information handling system entering a recovery mode; and
   decrypting a drive partition using the recovery key subsequent to the retrieving of the recovery key from the BIOS firmware by the local account via the user interface displayed in response to the information handling system entering the recovery mode.

2. The method of claim 1, wherein the recovery key is retrieved from the remote server using a lightweight directory access protocol account.

3. The method of claim 1, further comprising encrypting the recovery key.

4. The method of claim 1, further comprising parsing the BIOS firmware to extract the recovery key.

5. The method of claim 1, further comprising displaying the recovery key via the user interface.

6. The method of claim 1, wherein the recovery key includes a password.

7. The method of claim 1, wherein the recovery key was stored in the remote server subsequent to encrypting the drive partition.

8. The method of claim 1, further comprising storing the recovery key in a non-volatile random access memory.

9. An information handling system, comprising:
   a processor; and
   a memory coupled to the processor, the memory storing code that when executed causes the processor to perform operations including:
      retrieving a recovery key from a remote service;
      injecting the recovery key within a basic input/output system (BIOS) firmware of the information handling system subsequent to granting a local account access to the recovery key;
      providing a user interface in response to the information handling system entering a recovery mode; and
      decrypting a drive partition using the recovery key subsequent to the retrieving the recovery key from the BIOS firmware by the local account via the user interface displayed in response to the information handling system entering the recovery mode.

10. The information handling system of claim 9, wherein the recovery key is retrieved from the remote service using a lightweight directory access protocol account.

11. The information handling system of claim 9, wherein the recovery key includes a password.

12. The information handling system of claim 9, wherein the operations further comprise parsing the BIOS firmware to extract the recovery key.

13. The information handling system of claim 9, wherein the operations further comprise displaying the recovery key via the user interface.

14. A non-transitory computer-readable medium to store instructions that are executable to perform operations comprising:
   retrieving a recovery key from a remote server;
   injecting the recovery key within a basic input/output system (BIOS) firmware of an information handling system subsequent to granting a local account access to the recovery key;
   providing a user interface in response to the information handling system entering a recovery mode; and
   decrypting a drive partition using the recovery key subsequent to the retrieving of the recovery key from the BIOS firmware by the local account via the user interface displayed in response to the information handling system entering the recovery mode.

15. The non-transitory computer-readable medium of claim 14, wherein the operations further comprise encrypting the recovery key.

16. The non-transitory computer-readable medium of claim 14, wherein the operations further comprise parsing the BIOS firmware to extract the recovery key.

17. The non-transitory computer-readable medium of claim 14, wherein the operations further comprise displaying the recovery key via the user interface.

18. The non-transitory computer-readable medium of claim 14, wherein the operations further comprise encrypting the drive partition.

19. The non-transitory computer-readable medium of claim 14, wherein the operations further comprise storing the recovery key in a non-volatile random access memory.

20. The non-transitory computer-readable medium of claim 14, wherein the recovery key was stored in the BIOS subsequent to retrieving the recovery key from the remote server.

* * * * *